(12) United States Patent
Sun et al.

(10) Patent No.: US 11,838,846 B2
(45) Date of Patent: Dec. 5, 2023

(54) CONFIGURATION METHOD AND CONTROLLER

(71) Applicant: Huawei Technologies Co., Ltd., Shenzhen (CN)

(72) Inventors: Chunxia Sun, Beijing (CN); Yaokun Zhang, Beijing (CN); Hailin Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 300 days.

(21) Appl. No.: 17/360,926

(22) Filed: Jun. 28, 2021

(65) Prior Publication Data

US 2021/0329529 A1    Oct. 21, 2021

Related U.S. Application Data

(63) Continuation of application No. PCT/CN2019/129772, filed on Dec. 30, 2019.

(30) Foreign Application Priority Data

Dec. 29, 2018  (CN) .......................... 201811643001.2

(51) Int. Cl.
*H04L 47/2483*  (2022.01)
*H04W 40/24*  (2009.01)
(Continued)

(52) U.S. Cl.
CPC ......... *H04W 40/12* (2013.01); *H04L 47/2483* (2013.01); *H04L 61/103* (2013.01); *H04W 24/08* (2013.01); *H04W 40/24* (2013.01)

(58) Field of Classification Search
CPC ..... H04W 40/12; H04W 24/08; H04W 40/24; H04W 92/12; H04W 92/20; H04W 24/02;
(Continued)

(56) References Cited

U.S. PATENT DOCUMENTS

2013/0076119 A1   3/2013   Yogeeswaran et al.
2014/0098679 A1   4/2014   Baillargeon
(Continued)

FOREIGN PATENT DOCUMENTS

CN     101321092 A     12/2008
CN     102299923 A     12/2011
(Continued)

OTHER PUBLICATIONS

Hedayat et al., "A Two-Way Active Measurement Protocol (TWAMP)," Network Working Group, rfc5357, Category: Standards Track, total 26 pages (Oct. 2008).
(Continued)

*Primary Examiner* — Ashley Shivers
(74) *Attorney, Agent, or Firm* — Leydig, Voit & Mayer, Ltd.

(57) ABSTRACT

A configuration method and a controller are provided. The configuration method is applied to a network on which detection is performed by using the two-way active measurement protocol (TWAMP), and may include: receiving, by a controller, a request packet sent by an ingress network device, where the ingress network device is a network device through which a service flow flows into the network, and the request packet includes a destination IP address of the service flow; and determining, by the controller, based on the destination IP address, that the service flow is an X2 service flow, and sending configuration information for TWAMP detection to the ingress network device and an egress network device, where the egress network device is a network device through which the service flow flows out of the network.

14 Claims, 8 Drawing Sheets

(51) Int. Cl.
*H04W 40/12* (2009.01)
*H04L 61/103* (2022.01)
*H04W 24/08* (2009.01)

(58) Field of Classification Search
CPC ............... H04L 47/2483; H04L 61/103; H04L 41/0806; H04L 43/0864
See application file for complete search history.

(56) References Cited

U.S. PATENT DOCUMENTS

| | | | |
|---|---|---|---|
| 2014/0169183 A1 | 6/2014 | Allan et al. | |
| 2014/0226507 A1 | 8/2014 | Bonnier et al. | |
| 2018/0338338 A1* | 11/2018 | Baillargeon | ........ H04L 43/103 |
| 2018/0343056 A1 | 11/2018 | Radulescu et al. | |

FOREIGN PATENT DOCUMENTS

| | | |
|---|---|---|
| CN | 102638898 A | 8/2012 |
| CN | 102958197 A | 3/2013 |
| CN | 103200590 A | 7/2013 |
| CN | 104426801 A | 3/2015 |
| CN | 106507398 A | 3/2017 |
| CN | 106936661 A | 7/2017 |
| CN | 107995015 A | 5/2018 |
| CN | 108541001 A | 9/2018 |
| EP | 2765740 A1 | 8/2014 |
| WO | 2014091327 A2 | 6/2014 |

OTHER PUBLICATIONS

Shalunov et al., "A One-way Active Measurement Protocol (OWAMP)," Network Working Group, rfc4656, Category: Standards Track, total 56 pages (Sep. 2006).

* cited by examiner

CONFIGURATION METHOD AND CONTROLLER

CROSS-REFERENCE TO RELATED APPLICATIONS

This application is a continuation of International Application No. PCT/CN2019/129772, filed on Dec. 30, 2019, which claims priority to Chinese Patent Application No. 201811643001.2, filed on Dec. 29, 2018. The disclosures of the aforementioned applications are hereby incorporated by reference in their entireties.

TECHNICAL FIELD

Embodiments of this application relate to the field of communications technologies, and in particular, to a configuration method and a controller.

BACKGROUND

In a solution of a 5th generation mobile communications technology (5G for short) of an internet protocol radio access network (IP RAN for short), a performance monitoring technology such as the two-way active measurement protocol (TWAMP for short) is used to measure performance indicators such as a latency, a jitter, and a packet loss ratio of a 4th generation mobile communications technology (4G for short)/5G service. The performance indicators need to include performance indicators of two wireless services, namely, an S1 service and an X2 service.

A data service flow related to the X2 service may be referred to as an X2 service flow for short, and generally refers to a service flow from a base station to another base station. Theoretically, a physical distance between base stations is relatively short, and an X2 service flow may exist between the base stations. Referring to FIG. 1, a flow direction of a service flow between a base station (eNB) and another base station is indicated by a dashed arrow. On the IP RAN, an ingress network device of a service flow may be a CSG, and an egress network device may be another CSG. However, two CSGs to which base stations having an X2 service therebetween are connected cannot be clearly learned of during initial service deployment, that is, two CSGs that have an X2 service flow therebetween cannot be determined. Consequently, two CSGs for which TWAMP detection needs to be configured for an X2 service cannot be learned of. If TWAMP detection is deployed for any two CSGs, it is impossible that there is an X2 service between a base station and all other base stations because of a limited quantity of neighboring base stations of the base station. Therefore, a CSG has the X2 service with only a small quantity of CSGs, but does not have the X2 service with a majority of CSGs. Therefore, if the TWAMP detection is deployed for any two CSGs, there are a large quantity of redundant and invalid configurations. In addition, a TWAMP capacity of the CSG is limited, and the redundant configurations pose a challenge to a device capacity.

SUMMARY

A technical problem to be resolved in embodiments of this application is to provide a configuration method and a controller based on TWAMP detection, to resolve a problem that TWAMP detection cannot be accurately configured for an X2 service, thereby improving efficiency of the TWAMP detection.

According to a first aspect, an embodiment of this application provides a configuration method, applied to a network on which detection is performed by using the two-way active measurement protocol TWAMP. The method may include:

A controller receives a request packet sent by an ingress network device, where the ingress network device is a network device through which a service flow flows into the network, and the request packet includes a destination IP address of the service flow; and the controller determines, based on the destination IP address, that the service flow is an X2 service flow, and sends configuration information for TWAMP detection to the ingress network device and an egress network device, where the egress network device is a network device through which the service flow flows out of the network.

The controller determines, based on the destination IP address of the service flow by identifying information about the ingress network device and the egress network device of the service flow, whether the service flow is a correct X2 service flow. In this way, the configuration information for the TWAMP detection can be automatically sent based on information such as addresses of interfaces, of the ingress network device and egress network device, bound to a VRF, thereby improving system detection efficiency and implementing TWAMP detection deployment for services in batches.

In a possible implementation, that the controller determines, based on the destination IP address, that the service flow is an X2 service flow includes:

The controller searches for, based on the destination IP address, an egress device and a private network interface that correspond to the destination IP address; and the controller determines that the service flow is the X2 service flow, if the controller determines that the found egress device and the found private network interface are respectively an egress device and a private network interface that are obtained through mask matching.

The X2 service flow is identified through mask matching, which is convenient and fast and efficient.

In a possible implementation, that the controller sends configuration information for TWAMP detection to the ingress network device and the egress network device includes:

The controller forwards the request packet to the egress network device;

when the egress network device determines that the destination IP address corresponds to a virtual link VLINK route or an address resolution protocol ARP or a static route that is of the egress network device, the controller receives a response packet sent by the egress network device;

the controller forwards the response packet to the ingress network device; and the controller separately sends the configuration information for the TWAMP detection to the ingress network device and the egress network device.

In a possible implementation, the request packet, the response packet, and a configuration packet that carries the configuration information use a same packet format, and the packet format includes a role field, a message type field, a response value field, a source IP address field of the service flow, and a destination IP address field of the service flow, where the role field is used to indicate a role of a device sending a packet, and the device role includes the ingress network device, the controller, and the egress network device;

the message type field is used to indicate a message type, and the message type includes the request packet, the response packet, and the configuration packet;

the response value field is used to indicate whether the service flow is the X2 service flow, and is valid when a value of the message type field indicates a response packet;

the source IP address field of the service flow is used to indicate a source IP address of the service flow; and the destination IP address field of the service flow is used to indicate the destination IP address of the service flow.

According to a second aspect, an embodiment of this application provides a configuration method, applied to a network on which detection is performed by using the two-way active measurement protocol TWAMP. The method may include:

After a traffic analyzer collects an ingress service flow of a first device and an egress service flow of a second device for analysis, and determines that the first device is an ingress network device through which a service flow flows into the network, and that the second device is an egress network device through which the service flow flows out of the network, a controller receives a request packet sent by the traffic analyzer, where the request packet includes a first identifier and a first interface of the ingress network device, a second identifier and a second interface of the egress network device, and a source IP address and a destination IP address of the service flow; and the controller determines, based on the information in the request packet, that the service flow is an X2 service flow, and sends configuration information for TWAMP detection to the ingress network device and the egress network device.

In a possible implementation, that the controller determines, based on the information in the request packet, that the service flow is an X2 service flow includes:

The controller determines that the ingress network device and the egress network device are bound to a same routing forwarding table VRF;

the controller indicates the ingress network device to determine whether the source IP address corresponds to a VLINK route or an ARP or a static route that is on the first interface, and indicates the egress network device to determine whether the destination IP address corresponds to a virtual link VLINK route or an address resolution protocol ARP or a static route that is on the second interface;

when the ingress network device determines that the source IP address corresponds to the virtual link VLINK route or the address resolution protocol ARP or the static route that is on the first interface, the controller receives a first response packet sent by the egress network device;

when the egress network device determines that the destination IP address corresponds to the virtual link VLINK route or the address resolution protocol ARP or the static route that is on the second interface, the controller receives a second response packet sent by the egress network device; and the controller determines that the service flow is the X2 service flow.

In a possible implementation, the request packet, the response packet, and a configuration packet that carries the configuration information use a same packet format, and the packet format includes a role field, a message type field, a response value field, a source IP address field of the service flow, and a destination IP address field of the service flow, where the role field is used to indicate a role of a device sending a packet, and the device role includes the ingress device, the controller, and the egress device;

the message type field is used to indicate a message type, and the message type includes the request packet, the response packet, and the configuration packet;

the response value field is used to indicate whether the service flow is the X2 service flow, and is valid when a value of the message type field indicates a response packet;

the source IP address field of the service flow is used to indicate the source IP address of the service flow; and the destination IP address field of the service flow is used to indicate the destination IP address of the service flow.

According to a third aspect, an embodiment of this application provides a controller. The controller may include:

a transceiver unit, configured to receive a request packet sent by an ingress network device, where the ingress network device is a network device through which a service flow flows into the network, and the request packet includes a destination IP address of the service flow; and a processing unit, configured to: determine, based on the destination IP address, that the service flow is an X2 service flow, and indicate the transceiver unit to send configuration information for TWAMP detection to the ingress network device and an egress network device, where the egress network device is a network device through which the service flow flows out of the network.

In a possible implementation, the processing unit is specifically configured to:

search for, based on the destination IP address, an egress device and a private network interface that correspond to the destination IP address; and determine that the service flow is the X2 service flow, if the found egress device and the found private network interface are respectively an egress device and a private network interface that are obtained through mask matching.

In a possible implementation, the transceiver unit is specifically configured to:

forward the request packet to the egress network device;

when the egress network device determines that the destination IP address corresponds to a virtual link VLINK route or an address resolution protocol ARP or a static route that is of the egress network device, receive a response packet sent by the egress network device;

forward the response packet to the ingress network device; and separately send the configuration information for the TWAMP detection to the ingress network device and the egress network device.

In a possible implementation, the request packet, the response packet, and a configuration packet that carries the configuration information use a same packet format, and the packet format includes a role field, a message type field, a response value field, a source IP address field of the service flow, and a destination IP address field of the service flow, where the role field is used to indicate a role of a device sending a packet, and the device role includes the ingress network device, the controller, and the egress network device;

the message type field is used to indicate a message type, and the message type includes the request packet, the response packet, and the configuration packet;

the response value field is used to indicate whether the service flow is the X2 service flow, and is valid when a value of the message type field indicates a response packet;

the source IP address field of the service flow is used to indicate a source IP address of the service flow; and the destination IP address field of the service flow is used to indicate the destination IP address of the service flow.

According to a fourth aspect, an embodiment of this application provides a controller. The controller may include:

a transceiver unit, configured to: after a traffic analyzer collects an ingress service flow of a first device and an egress service flow of a second device for analysis, and determines that the first device is an ingress network device through which a service flow flows into the network, and that the second device is an egress network device through which the service flow flows out of the network, receive a request packet sent by the traffic analyzer, where the request packet includes a first identifier and a first interface of the ingress network device, a second identifier and a second interface of the egress network device, and a source IP address and a destination IP address of the service flow; and a processing unit, configured to: determine, based on the information in the request packet, that the service flow is an X2 service flow, and send configuration information for TWAMP detection to the ingress network device and the egress network device.

In a possible implementation, the processing unit is specifically configured to:

determine that the ingress network device and the egress network device are bound to a same routing forwarding table VRF; and indicate the ingress network device to determine whether the source IP address corresponds to a VLINK route or an ARP or a static route that is on the first interface, and indicate the egress network device to determine whether the destination IP address corresponds to a virtual link VLINK route or an address resolution protocol ARP or a static route that is on the second interface;

when the ingress network device determines that the source IP address corresponds to the virtual link VLINK route or the address resolution protocol ARP or the static route that is on the first interface, the transceiver unit is further configured to receive a first response packet sent by the egress network device;

when the egress network device determines that the destination IP address corresponds to the virtual link VLINK route or the address resolution protocol ARP or the static route that is on the second interface, the transceiver unit is further configured to receive a second response packet sent by the egress network device; and the processing unit is further configured to determine that the service flow is the X2 service flow.

In a possible implementation, the request packet, the response packet, and a configuration packet that carries the configuration information use a same packet format, and the packet format includes a role field, a message type field, a response value field, a source IP address field of the service flow, and a destination IP address field of the service flow, where the role field is used to indicate a role of a device sending a packet, and the device role includes the ingress device, the controller, and the egress device;

the message type field is used to indicate a message type, and the message type includes the request packet, the response packet, and the configuration packet;

the response value field is used to indicate whether the service flow is the X2 service flow, and is valid when a value of the message type field indicates a response packet;

the source IP address field of the service flow is used to indicate the source IP address of the service flow; and the destination IP address field of the service flow is used to indicate the destination IP address of the service flow.

According to a fifth aspect, an embodiment of this application provides a controller. The controller may include:

a processor and a memory, where the processor is connected to the memory, the memory is configured to store a computer instruction, and the processor is configured to invoke the computer instruction stored in the memory, to perform the steps in any one of the first aspect, the second aspect, the implementations of the first aspect, or the implementations of the second aspect in the embodiments of this application.

According to a sixth aspect, an embodiment of this application provides a computer-readable storage medium. The computer-readable storage medium stores an instruction, and when the instruction is run on a computer, the method according to any one of the first aspect, the second aspect, the implementations of the first aspect, or the implementations of the second aspect is implemented.

BRIEF DESCRIPTION OF DRAWINGS

To describe the technical solutions in the embodiments of this application or in the background more clearly, the following describes the accompanying drawings used in the embodiments of this application or the background.

DESCRIPTION OF EMBODIMENTS

The following describes the embodiments of this application with reference to the accompanying drawings in the embodiments of this application.

The terms "comprising", "including", or any other variations thereof in the specification, the claims, and the accompanying drawings of this application, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
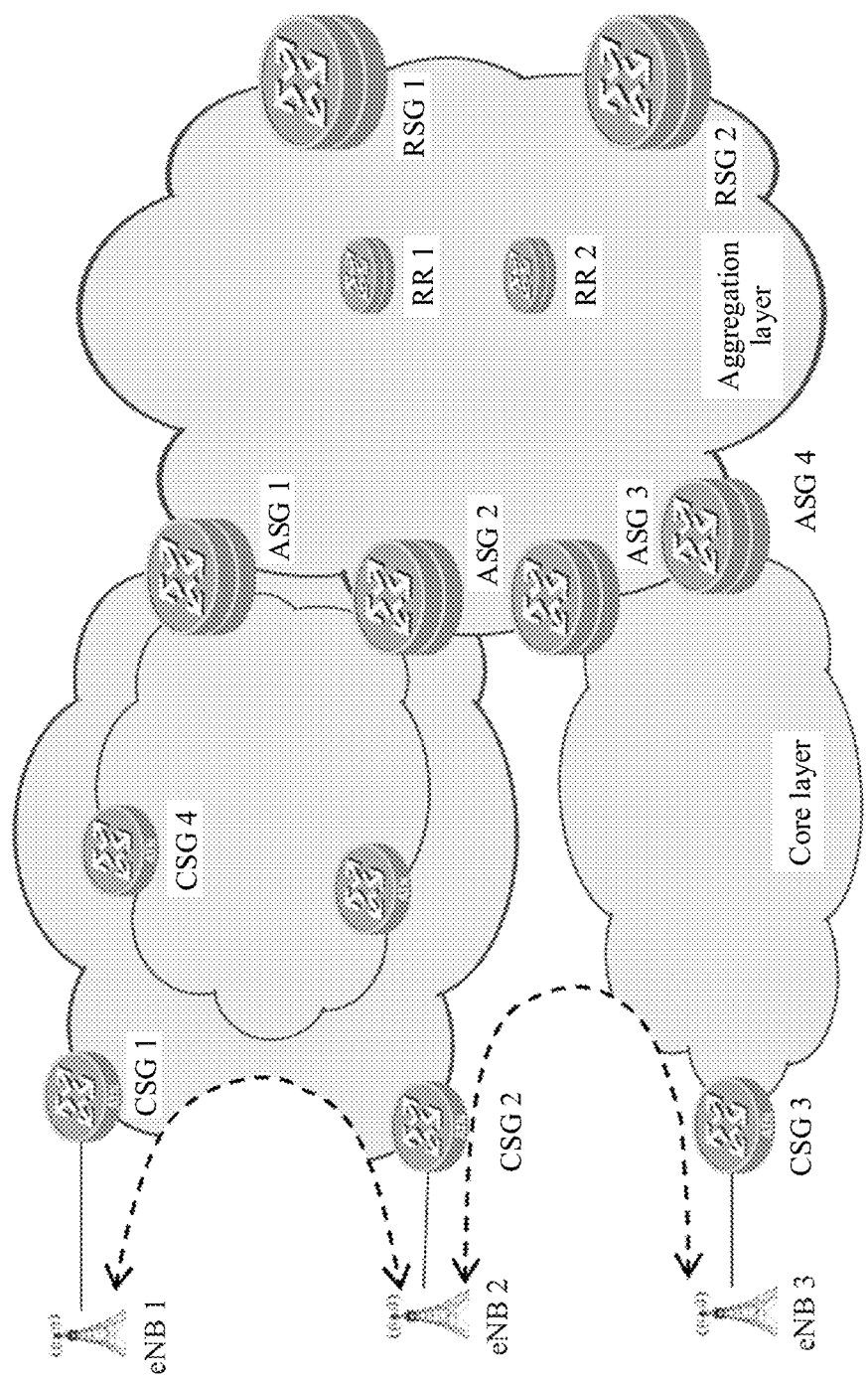
FIG. 1 is a schematic reference diagram of an X2 service flow path in an IP RAN system architecture according to an embodiment of this application.

This application may be applied to an IP RAN. The network includes a network device. The network device performs a routing forwarding function and may be a router, a switch, a forwarder, or the like. The router, the switch, and the forwarder may be physical devices, or may be virtual devices (for example, a virtual server, a virtual router, a virtual switch, or a virtual forwarder) implemented based on a virtualization technology. Depending on a location and a role of a network device deployed on the network, the network device may also be referred to as a cell site gateway (CSG for short), an access service gateway (ASG for short), a route reflector (RR for short), a radio network controller site gateway (RSG), or the like. FIG. 1 is a schematic reference diagram of an X2 service flow path in an IP RAN system architecture. The architecture shown in FIG. 1 includes base stations (eNB), CSGs, ASGs, RRs, RSGs, and the like.

The CSG is connected to the eNB, and the RSG is connected to an EPC (not shown in FIG. 1). The ASG may be configured to connect a core layer and an aggregation layer, and the RR may be configured to connect the ASG and the RSG or another RR. There is an S1 service flow between a CSG and an RSG. A flow of an S1 service may be referred to as an S1 service flow for short, and generally refers to a service flow from a base station to an evolved packet core (EPC for short) device. On an IP RAN, an ingress network device of the service flow may be a CSG, and an egress network device may be an RSG (the CSG is connected to a base station, and the RSG is connected to a base station controller). Because there is the S1 service flow between the CSG and the RSG, TWAMP detection for the S1 service can be configured for all CSGs and all RSGs. It is not clear whether there is an X2 service flow between the CSGs. A case in which there is the X2 service flow between different CSGs includes but is not limited to the following:

(1) There is the X2 service flow between CSGs on a same access ring, such as a CSG 1 and a CSG 2 in FIG. 1.
(2) There is the X2 service flow between CSGs on different access rings connected to a same ASG, such as a CSG 1 to a CSG 4 in FIG. 1.
(3) There is the X2 service flow between CSGs on different access rings connected to different ASGs, such as a CSG 2 and a CSG 3 in FIG. 1.

A virtual private network (VPN for short) and a public network tunnel design in an IP RAN solution can ensure correct forwarding of the X2 service flow in the foregoing three scenarios. However, two CSGs to which base stations having an X2 service therebetween are connected cannot be clearly learned of during initial service deployment, that is, two CSGs that have an X2 service flow therebetween cannot be determined. Consequently, two CSGs for which TWAMP detection needs to be configured for the X2 service cannot be learned of, and a plan cannot be made in advance. In addition, in the 3rd generation mobile communications technology (3G for short) 3G/4G era, traffic of the X2 service accounts for a relatively small proportion, approximately, 13%. However, a proportion of X2 service traffic between two base stations is higher in the 5G era and even subsequent eras with higher-level communications technologies. Therefore, performance detection for the X2 service is required. In the embodiments of this application, a normal X2 service flow can be identified through flow identification and device identification, and an ingress device and an egress device of the service flow on the IP RAN are identified and confirmed. Then, configuration information for the TWAMP detection may be automatically sent based on information such as IP address of interfaces, of the ingress device and the egress device, bound to a routing forwarding table (VRF for short). The following problems on the IP RAN are resolved: Base stations that have the X2 service therebetween cannot be accurately learned of when the TWAMP detection is deployed for a 5G service, and the TWAMP detection cannot be deployed on the entire network for all the base stations. In this way, planning-free and automatic TWAMP deployment is implemented.

The following describes in detail configuration methods in this application with reference to FIG. 2 to FIG. 5B. The configuration methods in embodiments may be applied to a network on which detection is performed by using the TWAMP. For ease of description, in all the embodiments, identification of an X2 service flow and configuration of TWAMP detection are described. It should be noted that identification of an S1 service flow and the configuration of the TWAMP detection may also be performed by using the methods described in the embodiments of this application. Details are not described in the embodiments of this application.

Figure 2:
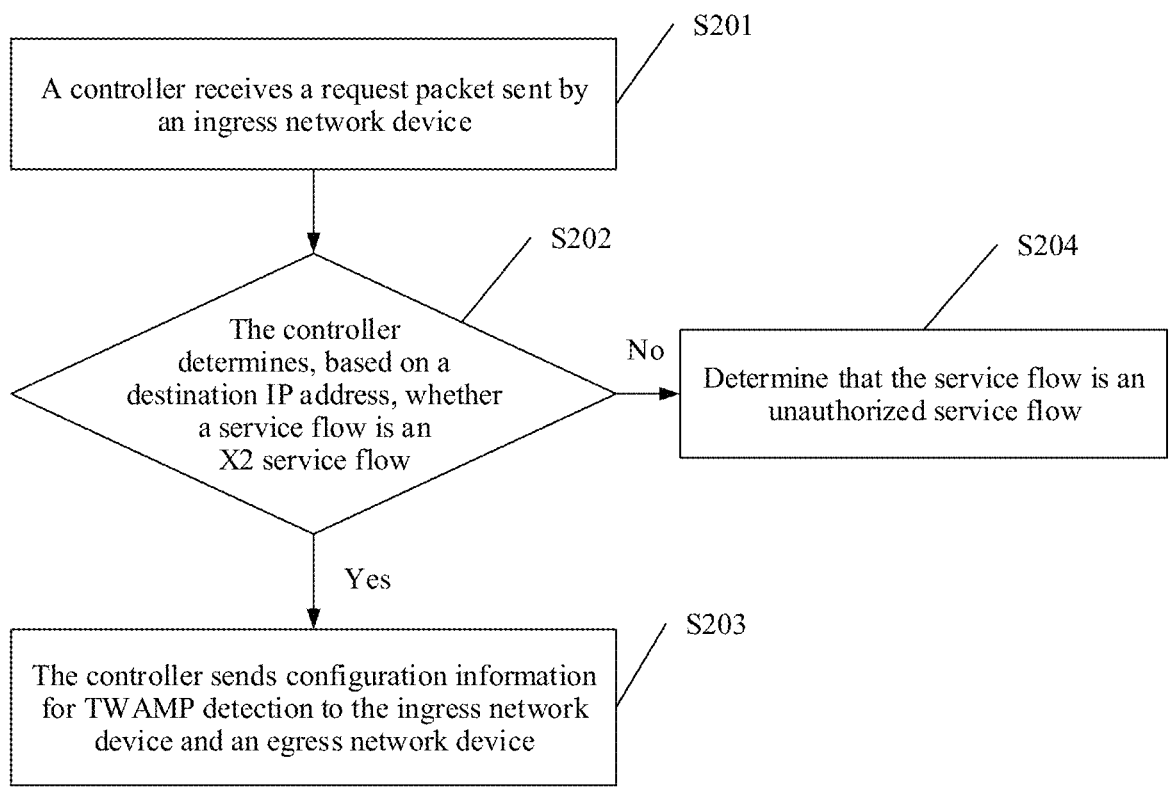
FIG. 2 is a schematic flowchart of a configuration method according to an embodiment of this application.

FIG. 2 is a schematic flowchart of a configuration method according to an embodiment of this application. The following steps are specifically included.

S201. A controller receives a request packet sent by an ingress network device.

The controller may be a controller device of a network manager or a network cloud engine-IP (NCE-IP for short). The ingress network device and an egress network device described below may be entities, virtual router devices, virtual switch devices, virtual forwarder devices, or the like.

Optionally, the request packet includes a destination IP address of a service flow.

A source IP address of an IP packet corresponding to the service flow is an address of a source base station, and the destination IP address can be found from a VRF table to implement normal forwarding of the IP packet.

S202. The controller determines, based on the destination IP address, whether the service flow is an X2 service flow; and if yes, performs step S203; otherwise, performs step S204.

S203. The controller sends configuration information for TWAMP detection to the ingress network device and the egress network device.

S204. Determine that the service flow is an unauthorized service flow.

In this embodiment of this application, the controller determines, based on the destination IP address of the service flow by identifying information about the ingress network device and the egress network device of the service flow, whether the service flow is a correct X2 service flow. In this way, the configuration information for the TWAMP detection can be automatically sent based on information such as addresses of interfaces, of the ingress network device and egress network device, bound to a VRF, thereby improving system detection efficiency and implementing TWAMP detection deployment for services in batches.

Figure 3A:
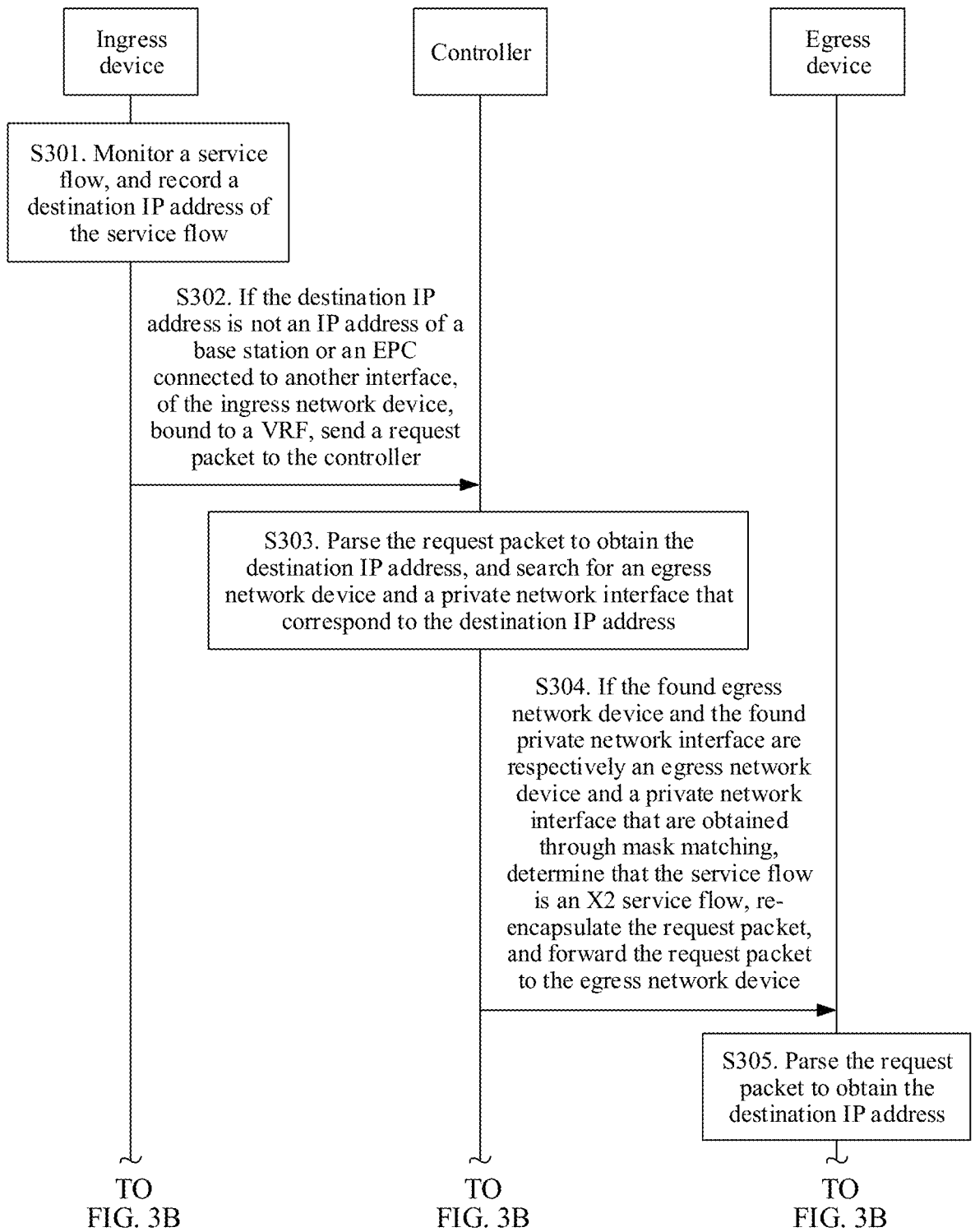
FIG. 3A and FIG. 3B are a schematic flowchart of another configuration method according to an embodiment of this application.
Figure 3B:
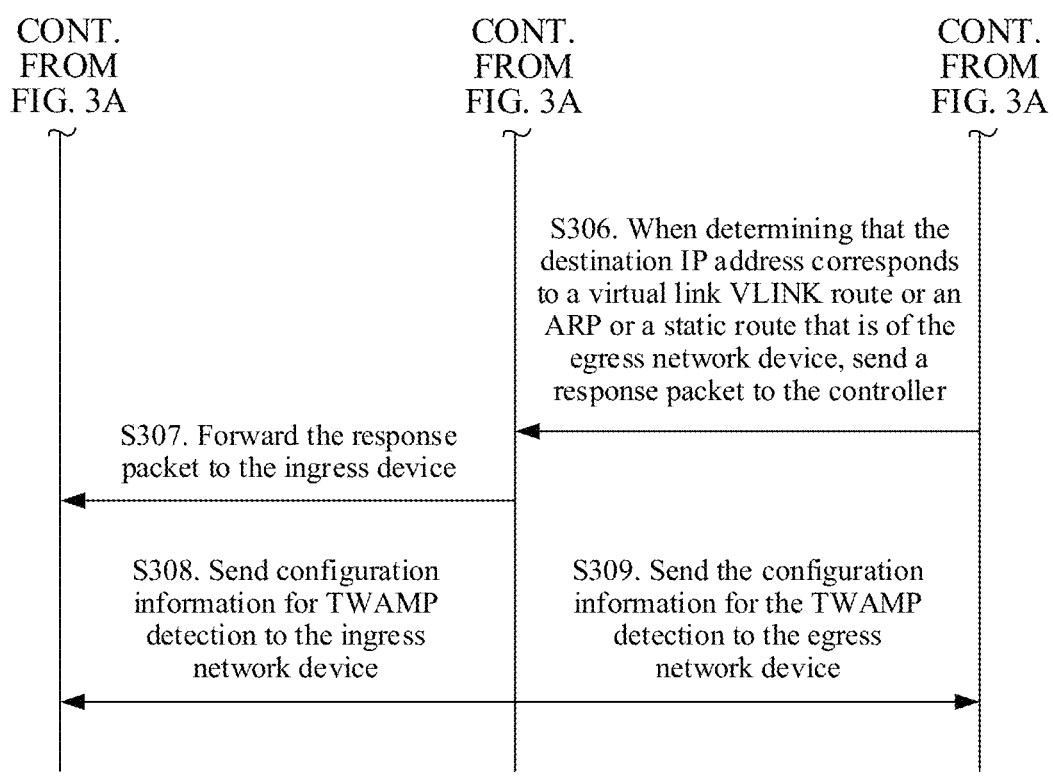

FIG. 3A and FIG. 3B are a schematic flowchart of another configuration method according to an embodiment of this application. In this embodiment, the method includes the following steps.

S301. An ingress network device monitors a service flow, and records a destination IP address of the service flow.

Optionally, if a TWAMP detection configuration corresponding to the destination IP address already exists, the TWAMP detection configuration may be ignored, and no subsequent processing is performed. Otherwise, a subsequent step may continue to be performed.

S302. If the destination IP address is not an IP address of a base station or an EPC connected to another interface, of the ingress network device, bound to a VRF, the ingress network device sends a request packet to a controller.

Optionally, if the destination IP address is the IP address of the base station connected to the another interface, of the ingress network device, bound to the VRF, it indicates that one CSG is connected to two base stations, and there is an X2 service flow between the two base stations. In this case, TWAMP detection is not required.

If the destination IP address is the IP address of the EPC connected to the another interface, of the ingress network device, bound to the VRF, it indicates that an RSG is connected to one base station nearby when being connected to the EPC, and there is an S1 service flow. In this case, the TWAMP detection is not required either. Therefore, in two foregoing cases, the TWAMP detection configuration may be ignored and no subsequent processing is performed. Otherwise, a subsequent step may continue to be performed.

S303. The controller parses the request packet to obtain the destination IP address, and searches for an egress network device and a private network interface that correspond to the destination IP address.

S304. If the found egress network device and the found private network interface are respectively an egress network device and a private network interface that are obtained through mask matching, the controller determines that the service flow is an X2 service flow, re-encapsulates the request packet, and forwards the request packet to the egress network device.

Optionally, if the found egress network device and the found private network interface are not respectively the egress network device and the private network interface that are obtained through mask matching, the controller determines that the service flow is an unauthorized service flow, and performs no subsequent processing. A mask known to the controller usually corresponds to a segment of an IP address. If the destination IP address is not in the segment of the IP address, it indicates the destination IP address does not match the mask. If the destination IP address is in the segment of the IP address, it indicates that the IP address matches the mask.

S305. The egress network device parses the request packet to obtain the destination IP address.

Then, the egress network device determines whether the destination IP address is an IP address of a base station corresponding to an interface, of the egress network device, bound to the VRF. (If the service flow is an S1 service flow, the service flow corresponds to the EPC.) A specific manner may be determined in a manner of step S306.

S306. When the egress network device determines that the destination IP address corresponds to a virtual link VLINK route or an ARP or a static route that is of the egress network device, the egress network device sends a response packet to the controller.

If none of foregoing conditions are met, the controller determines that the service flow is an unauthorized service flow, and performs no subsequent processing.

S307. The controller forwards the response packet to the ingress network device.

S308. The controller sends configuration information for the TWAMP detection to the ingress network device.

S309. The controller sends the configuration information for the TWAMP detection to the egress network device.

The configuration information for the TWAMP detection may include but is not limited to: a device that provides a TWAMP service, a port number used during detection, a packet sending parameter, and an IP address used during detection. More specifically, for a parameter configuration rule of the TWAMP detection, an ingress network device CSG of an X2 service may be used as the TWAMP server, and an ingress network device RSG of an S1 service may be used as the TWAMP server. The port number may be a number of an unused port on each device. The packet sending parameter may be sent based on a predetermined default value. IP addresses are private IP addresses of devices at two ends.

Optionally, in this embodiment, the request packet, the response packet, and a configuration packet that carries the configuration information may use a same packet format or different packet formats.

When the same packet format is used, the packet format may include but is not limited to a version field, a role field, a message type field, a response value field, and a source IP address (Stream source IP) field of the service flow, a destination IP address (Stream destination IP) field of the service flow, and a virtual private network VPN identifier (VPN target) field.

The version number field is used to indicate a version of the packet format. For example, a value 1 indicates a version 1.

The role field is used to indicate a role of a device sending a packet, and the device role includes the ingress network device, the controller, and the egress network device. For example, a value of the ingress network device may be 0, a value of the controller may be 1, and a value of the egress network device may be 2.

The message type field is used to indicate a message type, and the message type includes the request packet, the response packet, and the configuration packet. For example, a value of the request packet is 0, a value of the response packet is 1, and a value of the configuration packet is 2.

The response value field is used to indicate whether the service flow is the X2 service flow, and is valid when a value of the message type field indicates a response packet; and a default value is 0. This parameter is valid only when Message type is set to 1. A value of this parameter is 1 for the X2 service flow and is not 1 for an unauthorized service flow.

The source IP address field of the service flow is used to indicate a source IP address of the service flow.

The destination IP address field of the service flow is used to indicate the destination IP address of the service flow.

The VPN identifier field is used to identify a private network VPN.

For a transmission protocol of the foregoing packet, the transmission control protocol (TCP) may be used at a transport layer. For an IP packet of an outer layer of the packet, a source address or a destination address may be an IP address of a local loopback 0 interface of a device or an IP address of an NCE-IP.

Figure 4:
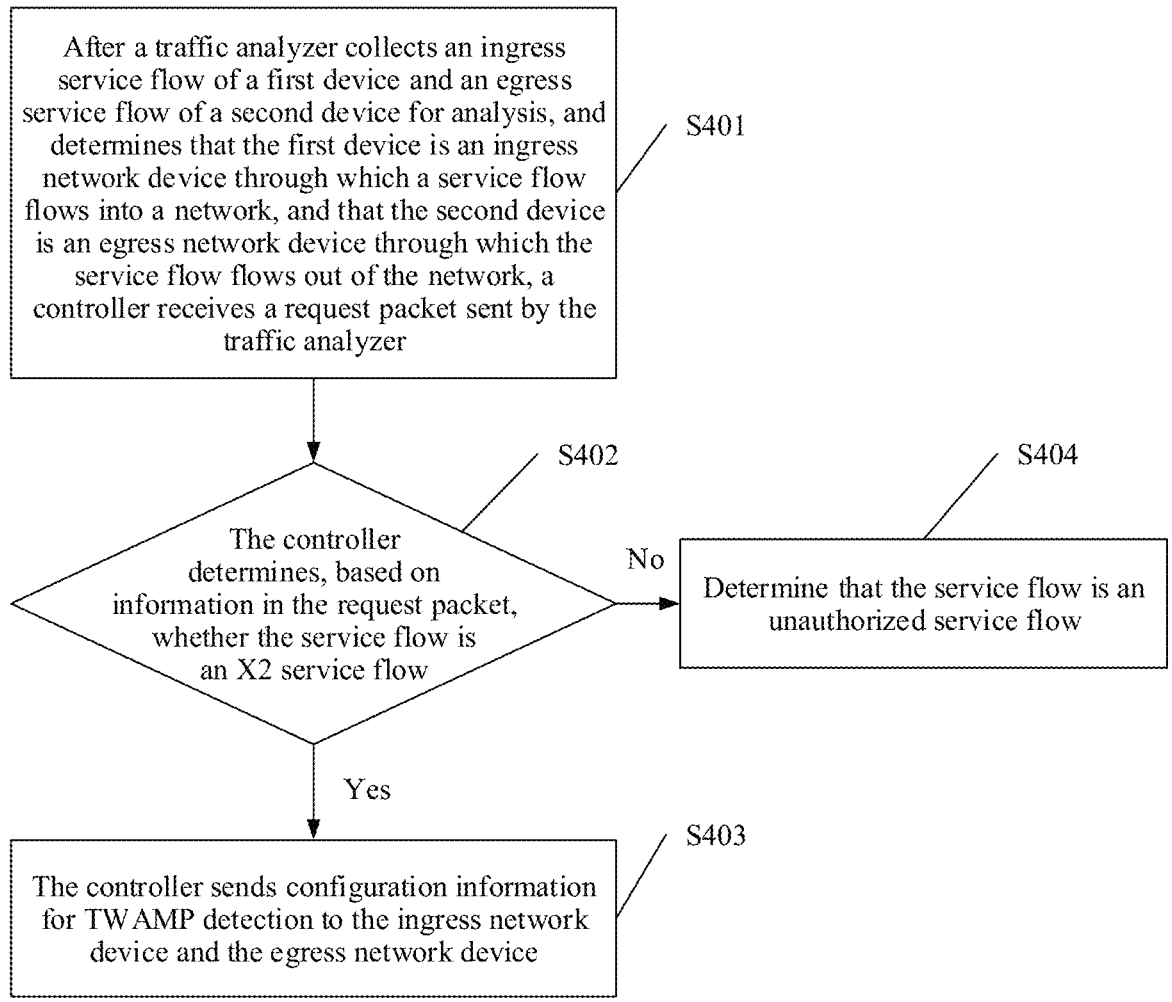
FIG. 4 is a schematic flowchart of still another configuration method according to an embodiment of this application.

FIG. 4 is a schematic flowchart of still another configuration method according to an embodiment of this application. In this embodiment, the method may include the following steps.

S401. After a traffic analyzer collects an ingress service flow of a first device and an egress service flow of a second device for analysis, and determines that the first device is an ingress network device of a service flow and that the second device is an egress network device of the service flow, a controller receives a request packet sent by the traffic analyzer.

The request packet includes a first identifier and a first interface of the ingress network device, a second identifier and a second interface of the egress network device, and a source IP address and a destination IP address of the service flow.

S402. The controller determines, based on the information in the request packet, whether the service flow is an X2 service flow; and if yes, performs step S403; otherwise, performs step S404.

S403. The controller sends configuration information for TWAMP detection to the ingress network device and the egress network device.

S404. Determine that the service flow is an unauthorized service flow.

In this embodiment of this application, service flow sampling may be deployed on interfaces, of all routers, bound to VRFs, and the traffic analyzer collects source IP addresses and destination IP addresses of sampled service flows on all the devices for analysis, to determine two devices that have the service flow therebetween and submit a determining result to the controller to further confirm whether the service flow is the X2 service flow. Finally, the controller automatically sends the configuration information for the TWAMP detection based on configuration information (including information about an interface IP address, an available port, or the like) of the ingress network device and the egress network device of the service flow, to reduce costs and implement batch service deployment in an automatic service flow identification manner that is triggered by the service flow.

Figure 5A:
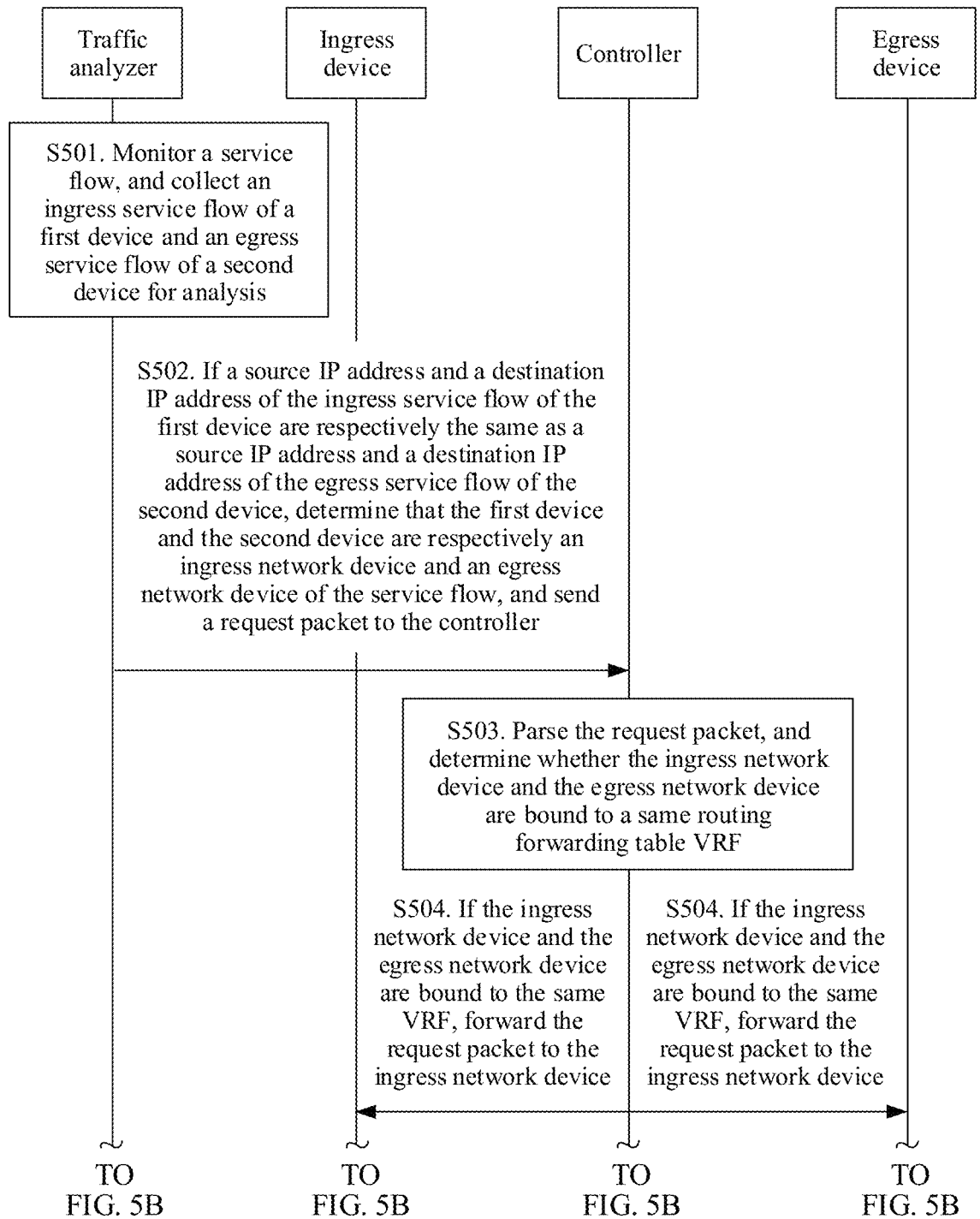
FIG. 5A and FIG. 5B are a schematic flowchart of still another configuration method according to an embodiment of this application.
Figure 5B:
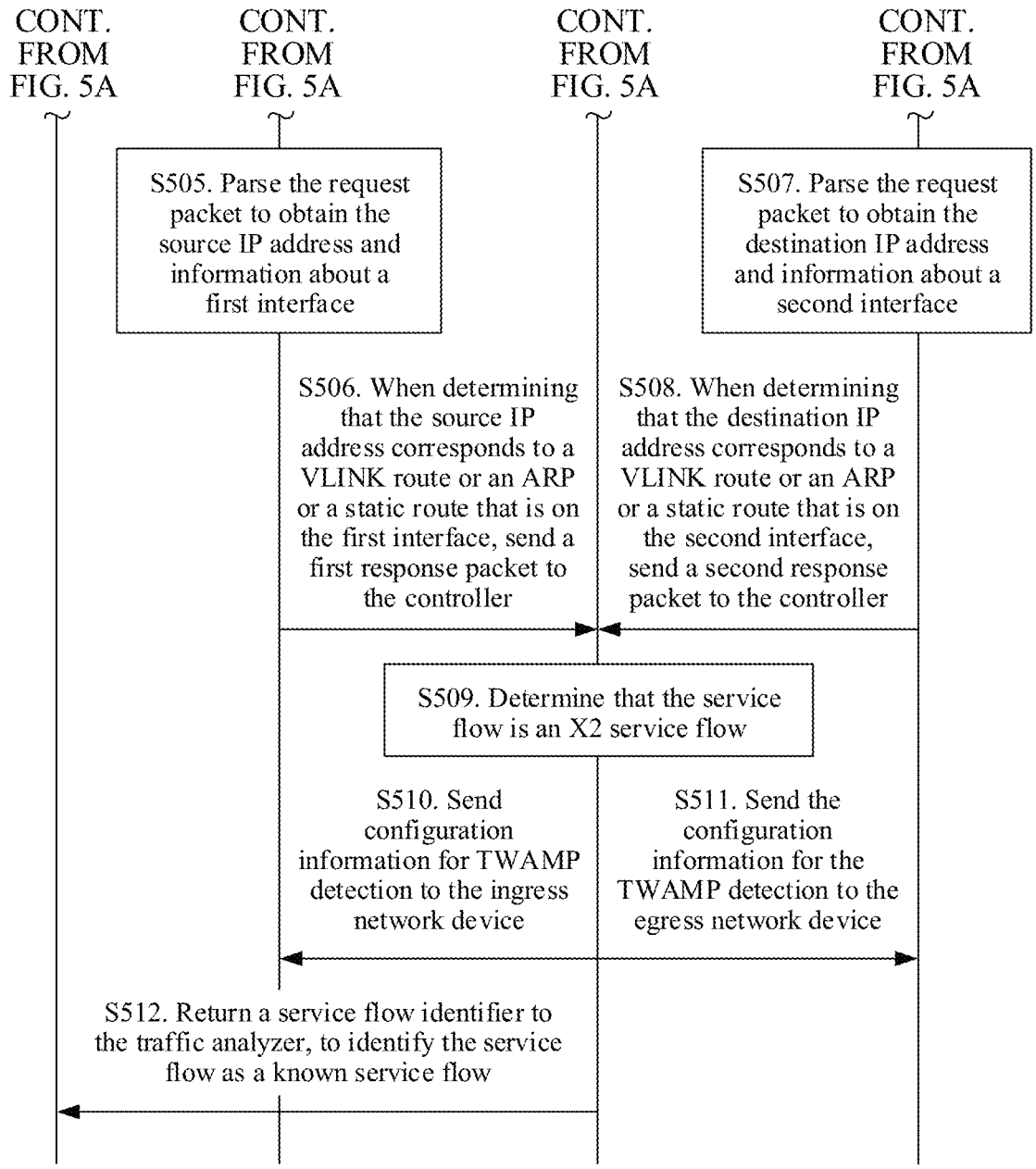

FIG. 5A and FIG. 5B are a schematic flowchart of still another configuration method according to an embodiment of this application. In this embodiment, the method includes the following steps.

S501. A traffic analyzer monitors a service flow, and collects an ingress service flow of a first device and an egress service flow of a second device for analysis.

It should be noted that, in this embodiment of this application, service flow sampling may be deployed on interfaces, of all routing devices, bound to VRFs, and the traffic analyzer collects source IP addresses and destination IP addresses of sampled service flows on all the routing devices for analysis, to analyze two routing devices that have the service flow therebetween. For ease of description, two devices, namely, the first device and the second device, are used for description herein. If there are a plurality of devices, the devices are paired for analysis. Details are not described herein.

S502. If a source IP address and a destination IP address of the ingress service flow of the first device are respectively the same as a source IP address and a destination IP address of the egress service flow of the second device, the traffic analyzer determines that the first device and the second device respectively are an ingress network device and an egress network device of the service flow, and sends a request packet to a controller.

The traffic analyzer can determine the ingress network device and egress network device of the service flow. However, usually, the traffic analyzer cannot ensure whether the service flow is an unauthorized service flow such as attack traffic, or whether two service flows are service flows with a same source or destination IP address but different VRF. Therefore, the controller needs to perform further identification and confirmation.

Optionally, if TWAMP detection configurations corresponding to the source IP address and the destination IP address already exist, the TWAMP detection configurations may be ignored, and no subsequent processing is performed. Otherwise, a subsequent step may continue to be performed.

S503. The controller parses the request packet, and determines whether the ingress network device and the egress network device are bound to a same routing forwarding table VRF.

S504. If the ingress network device and the egress network device are bound to the same VRF, the controller forwards the request packet to the ingress network device and the egress network device.

Optionally, if the ingress network device and the egress network device are not bound to the same VRF, the controller determines that the traffic analyzer performs analysis incorrectly, and may notify the traffic analyzer of the determining result.

S505. The ingress network device parses the request packet to obtain the source IP address and information about a first interface.

S506. When the ingress network device determines that the source IP address corresponds to a VLINK route or an ARP or a static route that is on the first interface, the ingress network device sends a first response packet to the controller.

Optionally, if none of all foregoing conditions are met, an error indication may be returned to the controller, to notify the controller that the service flow is an unauthorized service flow.

S507. The egress network device parses the request packet to obtain the destination IP address and information about a second interface.

S508. When the egress network device determines that the destination IP address corresponds to a VLINK route or an ARP or a static route that is on the second interface, the egress network device sends a second response packet to the controller.

Optionally, if none of all foregoing conditions are met, the error indication may be returned to the controller, to notify the controller that the service flow is the unauthorized service flow.

S509. The controller determines that the service flow is an X2 service flow.

S510. The controller sends configuration information for TWAMP detection to the ingress network device.

S511. The controller sends the configuration information for the TWAMP detection to the egress network device.

S512. The controller returns a service flow identifier to the traffic analyzer, to identify the service flow as a known service flow.

For the known service flow, the traffic analyzer does not need to analyze the known service flow within a specified period.

For descriptions of a configuration rule, a packet format, a packet transmission protocol, or the like of the configuration information for the TWAMP detection, refer to the descriptions in the embodiment shown in FIG. 3A and FIG. 3B. Details are not described herein again.

Figure 6:
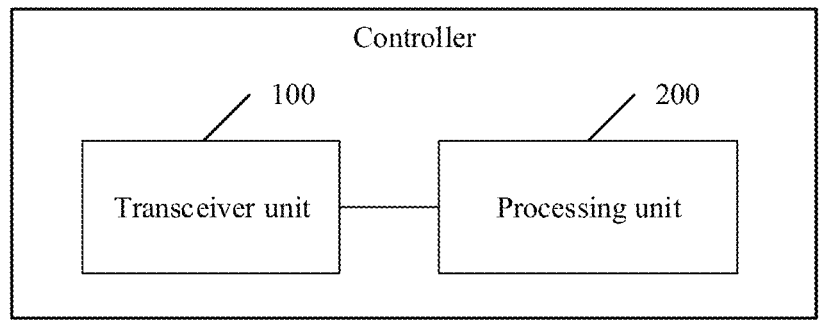
FIG. 6 is a schematic composition diagram of a controller according to an embodiment of this application.

FIG. 6 is a schematic composition diagram of a controller according to an embodiment of this application. The controller may include:

a transceiver unit 100, configured to receive a request packet sent by an ingress network device, where the ingress network device is a network device through which a service flow flows into the network, and the request packet includes a destination IP address of the service flow; and a processing unit 200, configured to: determine, based on the destination IP address, that the service flow is an X2 service flow, and indicate the transceiver unit 100 to send configuration information for TWAMP detection to the ingress network device and an egress network device, where the egress network device is a network device through which the service flow flows out of the network.

The processing unit 200 is specifically configured to:

search for, based on the destination IP address, an egress device and a private network interface that correspond to the destination IP address; and determine that the service flow is the X2 service flow, if the found egress device and the found private network interface are respectively an egress device and a private network interface that are obtained through mask matching.

Optionally, if the service flow is the X2 service flow, the transceiver unit 100 is specifically configured to:

forward the request packet to the egress network device;

when the egress network device determines that the destination IP address corresponds to a virtual link VLINK route or an address resolution protocol ARP or a static route that is of the egress network device, receive a response packet sent by the egress network device;

forward the response packet to the ingress network device; and separately send the configuration information for the TWAMP detection to the ingress network device and the egress network device.

Optionally, the request packet, the response packet, and a configuration packet that carries the configuration information use a same packet format.

Optionally, the packet format includes a version field, a role field, a message type field, a response value field, a source IP address field of the service flow, a destination IP address field of the service flow, and a virtual private network VPN identifier field, where the version field is used to indicate a version of the packet format;

the role field is used to indicate a role of a device sending a packet, and the device role includes the ingress network device, the controller, and the egress network device;

the message type field is used to indicate a message type, and the message type includes the request packet, the response packet, and the configuration packet;

the response value field is used to indicate whether the service flow is the X2 service flow, and is valid when a value of the message type field indicates a response packet;

the source IP address field of the service flow is used to indicate a source IP address of the service flow;

the destination IP address field of the service flow is used to indicate the destination IP address of the service flow; and the VPN identifier field is used to identify a private network VPN.

In another implementation, a controller may include:

a transceiver unit 100, configured to: after a traffic analyzer collects an ingress service flow of a first device and an egress service flow of a second device for analysis, and determines that the first device is an ingress network device through which a service flow flows into a network, and that the second device is an egress network device through which the service flow flows out of the network, receive a request packet sent by the traffic analyzer, where the request packet includes a first identifier and a first interface of the ingress network device, a second identifier and a second interface of the egress network device, and a source IP address and a destination IP address of the service flow; and a processing unit 200, configured to: determine, based on the information in the request packet, that the service flow is an X2 service flow, and indicate the transceiver unit 100 to send configuration information for TWAMP detection to the ingress network device and the egress network device.

Optionally, the processing unit 200 is specifically configured to:

determine that the ingress network device and the egress network device are bound to a same routing forwarding table VRF; and indicate the ingress network device to determine whether the source IP address corresponds to a VLINK route or an ARP or a static route that is on the first interface, and indicate the egress network device to determine whether the destination IP address corresponds to a virtual link VLINK route or an address resolution protocol ARP or a static route that is on the second interface;

when the ingress network device determines that the source IP address corresponds to the virtual link VLINK route or the address resolution protocol ARP or the static route that is on the first interface, the transceiver unit 100 is further configured to receive a first response packet sent by the egress network device;

when the egress network device determines that the destination IP address corresponds to the virtual link VLINK route or the address resolution protocol ARP or the static route that is on the second interface, the transceiver unit 100 is further configured to receive a second response packet sent by the egress network device; and the processing unit 200 is further configured to determine that the service flow is the X2 service flow.

Optionally, the request packet, the response packet, and a configuration packet that carries the configuration information use a same packet format.

Optionally, the packet format includes a version field, a role field, a message type field, a response value field, a source IP address field of the service flow, a destination IP address field of the service flow, and a virtual private network VPN identifier field, where the version field is used to indicate a version of the packet format;

the role field is used to indicate a role of a device sending a packet, and the device role includes the ingress network device, the controller, and the egress network device;

the message type field is used to indicate a message type, and the message type includes the request packet, the response packet, and the configuration packet;

the response value field is used to indicate whether the service flow is the X2 service flow, and is valid when a value of the message type field indicates a response packet;

the source IP address field of the service flow is used to indicate the source IP address of the service flow;

the destination IP address field of the service flow is used to indicate the destination IP address of the service flow; and the VPN identifier field is used to identify a private network VPN.

For concepts, explanations, detailed descriptions, and other steps of the controller that are related to the technical solutions provided in the embodiments of this application, refer to descriptions of the content in the foregoing method embodiments. Details are not described herein again.

Figure 7:
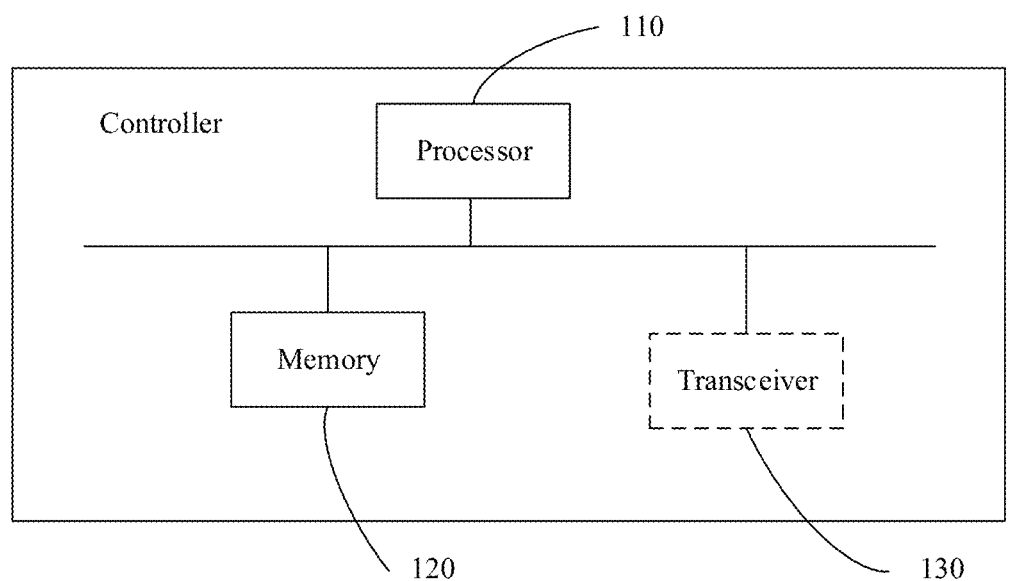
FIG. 7 is a schematic composition diagram of another controller according to an embodiment of this application.

FIG. 7 is a schematic composition diagram of another controller according to an embodiment of this application. As shown in FIG. 7, the controller may include a processor 110 and a memory 120. The processor 110 is connected to the memory 120. The memory 120 is configured to store an instruction. The processor 110 is configured to execute the instruction stored in the memory 120, to implement the steps in the methods corresponding to FIG. 2 to FIG. 5B.

Further, the controller may further include a transceiver 130. The processor 110, the memory 120, and the transceiver 130 are connected to each other.

The processor 110 is configured to execute the instruction stored in the memory 120, to control the transceiver 130 to receive a signal and control the transceiver 130 to send a signal, to complete the steps performed by the controller in the foregoing method. The transceivers 130 may be same physical entities or different physical entities. If being same physical entities, the physical entities may be collectively referred to as the transceiver 130, and if being different physical entities, the physical entities are referred to as a receiver and a transmitter respectively. The memory 120 may be integrated into the processor 110, or may be separated from the processor 110.

In an implementation, it may be considered that a function of the transceiver unit 130 is implemented by using a transceiver circuit or a special-purpose transceiver chip. It may be considered that the processor 110 is implemented by using a special-purpose chip, a processing circuit, a processor, or a general-purpose chip.

In another implementation, it may be considered that the controller provided in this embodiment of this application is implemented by using a general-purpose computer. To be specific, program code for implementing functions of the processor 110 and the transceiver 130 is stored in the memory, and the general purpose processor 110 implements the functions of the processor 110 and the transceiver 130 by executing the code in the memory.

For concepts, explanations, detailed descriptions, and other steps of the controller that are related to the technical solutions provided in the embodiments of this application, refer to descriptions of the content in the foregoing method embodiments. Details are not described herein again.

A person skilled in the art may understand that, for ease of description, FIG. 7 shows only one memory and only one processor. Actually, a controller may include a plurality of processors and memories. The memory may also be referred to as a storage medium, a storage device, or the like. This is not limited in this embodiment of this application.

It should be understood that, in this embodiment of this application, the processor may be a central processing unit (CPU for short), or the processor may be another general purpose processor, a digital signal processor (DSP for short), an application-specific integrated circuit (ASIC for short), a field programmable gate array (FPGA for short), or another programmable logical device, a discrete gate or transistor logical device, a discrete hardware component, or the like.

The memory may include a read-only memory and a random access memory, and provide an instruction and data to the processor. A part of the memory may further include a non-volatile random access memory.

In addition to a data bus, the bus may further include a power bus, a control bus, a status signal bus, and the like. However, for clear description, various buses are marked as buses in the figure.

In an implementation process, the steps in the foregoing methods can be implemented by using a hardware integrated logical circuit in the processor, or by using an instruction in a form of software. The steps in the methods disclosed with reference to the embodiments of this application may be directly performed by a hardware processor, or may be performed by using a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

According to the methods provided in the embodiments of this application, an embodiment of this application further provides a system, including the foregoing controller, the foregoing ingress network device, the foregoing egress network device, and a traffic analyzer that may exist independently or may be integrated with the controller.

Sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, various illustrative logical blocks (ILB for short) and steps described with reference to the embodiments disclosed in this specification may be implemented by electronic hardware, or a combination of computer software and electronic hardware. Whether these functions are performed in a hardware or software manner depends on a specific application and a design constraint condition of the technical solutions. A person skilled in the art may use different methods to implement the described functions for each specific application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, all or some of the procedures or the functions according to the embodiments of this application are generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, a computer, a server, or a data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A configuration method, applied to a network on which detection is performed by using a two-way active measurement protocol (TWAMP), comprising:
    receiving, by a controller, a request packet sent by an ingress network device, wherein the ingress network device is a network device through which a service flow flows into the network, and the request packet comprises a destination IP address of the service flow; and
    determining, by the controller, based on the destination IP address, that the service flow is an X2 service flow, and sending configuration information for TWAMP detection to the ingress network device and an egress network device, wherein the egress network device is a network device through which the service flow flows out of the network.

2. The configuration method according to claim 1, wherein the determining that the service flow is the X2 service flow comprises:
    searching for, by the controller based on the destination IP address, an egress device and a private network interface that correspond to the destination IP address; and
    determining, by the controller, that the service flow is the X2 service flow, in response to the controller determining that the found egress device and the found private network interface are respectively an egress device and a private network interface that are obtained through mask matching.

3. The configuration method according to claim 1, wherein sending the configuration information for the TWAMP detection to the ingress network device and the egress network device comprises:
    forwarding, by the controller, the request packet to the egress network device;
    in response to the egress network device determining that the destination IP address corresponds to a virtual link (VLINK) route or an address resolution protocol (ARP) or a static route that is of the egress network device, receiving, by the controller, a response packet sent by the egress network device;
    forwarding, by the controller, the response packet to the ingress network device; and
    separately sending, by the controller, the configuration information for the TWAMP detection to the ingress network device and the egress network device.

4. The configuration method according to claim 1, wherein
    the request packet, the response packet, and a configuration packet that carries the configuration information use a same packet format, and the same packet format comprises a role field, a message type field, a response value field, a source IP address field of the service flow, and a destination IP address field of the service flow, wherein
    the role field indicates a role of a device sending a packet, and the device role comprises the ingress network device, the controller, and the egress network device;
    the message type field indicates a message type, and the message type comprises the request packet, the response packet, and the configuration packet;
    the response value field indicates whether the service flow is the X2 service flow, and is valid in response to a value of the message type field indicating a response packet;
    the source IP address field of the service flow indicates a source IP address of the service flow; and
    the destination IP address field of the service flow indicates the destination IP address of the service flow.

5. A configuration method, applied to a network on which detection is performed by using a two-way active measurement protocol (TWAMP), comprising:
    after a traffic analyzer collects an ingress service flow of a first device and an egress service flow of a second device for analysis, and determines that the first device is an ingress network device through which a service flow flows into the network, and that the second device is an egress network device through which the service flow flows out of the network, receiving, by a controller, a request packet sent by the traffic analyzer, wherein the request packet comprises a first identifier and a first interface of the ingress network device, a second identifier and a second interface of the egress network device, and a source IP address and a destination IP address of the service flow; and determining, by the controller, based on the information in the request packet, that the service flow is an X2 service flow, and sending configuration information for TWAMP detection to the ingress network device and the egress network device.

6. The configuration method according to claim 5, wherein determining that the service flow is the X2 service flow comprises:

determining, by the controller, that the ingress network device and the egress network device are bound to a same virtual routing forwarding;

indicating, by the controller, the ingress network device to determine whether the source IP address corresponds to a virtual link (VLINK) route or an address resolution protocol (ARP) or a static route that is on the first interface, and indicating the egress network device to determine whether the destination IP address corresponds to a VLINK route or an ARP or a static route that is on the second interface;

in response to the ingress network device determining that the source IP address corresponds to the VLINK route or the ARP or the static route that is on the first interface, receiving, by the controller, a first response packet sent by the egress network device;

in response to the egress network device determining that the destination IP address corresponds to the VLINK route or the ARP or the static route that is on the second interface, receiving, by the controller, a second response packet sent by the egress network device; and determining, by the controller, that the service flow is the X2 service flow.

7. The configuration method according to claim 5, wherein the request packet, the response packet, and a configuration packet that carries the configuration information use a same packet format, and the packet format comprises a role field, a message type field, a response value field, a source IP address field of the service flow, and a destination IP address field of the service flow, wherein the role field indicates a role of a device sending a packet, and the device role comprises the ingress device, the controller, and the egress device;

the message type field indicates a message type, and the message type comprises the request packet, the response packet, and the configuration packet;

the response value field indicates whether the service flow is the X2 service flow, and is valid in response to a value of the message type field indicating a response packet;

the source IP address field of the service flow indicates the source IP address of the service flow; and the destination IP address field of the service flow indicates the destination IP address of the service flow.

8. A controller comprising:

a transceiver, a memory, and a processor;

the transceiver is configured to cooperate with the processor to receive a request packet sent by an ingress network device, wherein the ingress network device is a network device through which a service flow flows into the network, and the request packet comprises a destination IP address of the service flow; and the processor is configured to execute a computer-readable instruction stored in the memory to: determine, based on the destination IP address, that the service flow is an X2 service flow, and indicate the transceiver to send configuration information for a two-way active measurement protocol (TWAMP) detection to the ingress network device and an egress network device, wherein the egress network device is a network device through which the service flow flows out of the network.

9. The controller according to claim 8, wherein the processor is configured to execute the computer-readable instruction to:

search for, based on the destination IP address, an egress device and a private network interface that correspond to the destination IP address; and determine that the service flow is the X2 service flow, if the found egress device and the found private network interface are respectively an egress device and a private network interface that are obtained through mask matching.

10. The controller according to claim 8, wherein the transceiver configured to cooperate with the processor to:

forward the request packet to the egress network device;

receive a response packet sent by the egress network device, wherein the response packet indicates that the egress network device determines that the destination IP address corresponds to a virtual link (VLINK) route or an address resolution protocol (ARP) or a static route that is of the egress network device, forward the response packet to the ingress network device; and separately send the configuration information for the TWAMP detection to the ingress network device and the egress network device.

11. The controller according to claim 8, wherein the request packet, the response packet, and a configuration packet that carries the configuration information use a same packet format, and the same packet format comprises a role field, a message type field, a response value field, a source IP address field of the service flow, and a destination IP address field of the service flow, wherein the role field indicates a role of a device sending a packet, and the device role comprises the ingress network device, the controller, and the egress network device;

the message type field indicates a message type, and the message type comprises the request packet, the response packet, and the configuration packet;

the response value field indicates whether the service flow is the X2 service flow, and is valid when a value of the message type field indicates a response packet;

the source IP address field of the service flow indicates a source IP address of the service flow; and the destination IP address field of the service flow indicates the destination IP address of the service flow.

12. A controller comprising:

a transceiver, a memory, and a processor;

the transceiver is configured to cooperate with the processor to: receive a request packet sent by the traffic analyzer, wherein the request packet is received after a traffic analyzer collects an ingress service flow of a first device and an egress service flow of a second device for analysis, and determines that the first device is an ingress network device through which a service flow flows into the network, and that the second device is an egress network device through which the service flow flows out of the network, wherein the request packet comprises a first identifier and a first interface of the ingress network device, a second identifier and a second interface of the egress network device, and a source IP address and a destination IP address of the service flow; and the processor is configured to execute a computer-readable instruction stored in the memory to: determine, based on the information in the request packet, that the service flow is an X2 service flow, and indicate the transceiver to send configuration information for a two-way active measurement protocol (TWAMP) detection to the ingress network device and the egress network device.

13. The controller according to claim 12, wherein the processor is configured to execute the computer-readable instruction to:

determine that the ingress network device and the egress network device are bound to a same virtual routing forwarding; and indicate the ingress network device to determine whether the source IP address corresponds to a virtual link (VLINK) route or an address resolution protocol (ARP) or a static route that is on the first interface, and indicate the egress network device to determine whether the destination IP address corresponds to a VLINK route or an ARP or a static route that is on the second interface;

wherein the transceiver is further configured to cooperate with the processor to: receive a first response packet sent by the egress network device, wherein the first response packet indicates that the ingress network device determines that the source IP address corresponds to the VLINK route or the ARP or the static route that is on the first interface, wherein the transceiver is further configured to cooperate with the processor to: receive a second response packet sent by the egress network device, wherein the second response packet indicates that the egress network device determines that the destination IP address corresponds to the VLINK route or the ARP or the static route that is on the second interface, the transceiver is further configured to and wherein the processor is further configured to execute the computer-readable instruction to determine that the service flow is the X2 service flow.

14. The controller according to claim 12, wherein the request packet, the response packet, and a configuration packet that carries the configuration information use a same packet format, and the same packet format comprises a role field, a message type field, a response value field, a source IP address field of the service flow, and a destination IP address field of the service flow, wherein the role field indicates a role of a device sending a packet, and the device role comprises the ingress device, the controller, and the egress device;

the message type field indicates a message type, and the message type comprises the request packet, the response packet, and the configuration packet;

the response value field indicates whether the service flow is the X2 service flow, and is valid when a value of the message type field indicates a response packet;

the source IP address field of the service flow indicates the source IP address of the service flow; and the destination IP address field of the service flow indicates the destination IP address of the service flow.

* * * * *